United States Patent [19]

Llerandi

[11] Patent Number: 4,558,403
[45] Date of Patent: Dec. 10, 1985

[54] ORNAMENTAL HARNESS WITH LIGHTING EFFECTS

[76] Inventor: Ulises Llerandi, Naranjo 47-27, Col. Sta., Maria la Ribera, Mexico, D.F. 06400

[21] Appl. No.: 664,387

[22] Filed: Oct. 24, 1984

[30] Foreign Application Priority Data

Oct. 25, 1984 [MX] Mexico ................................ 199196

[51] Int. Cl.[4] .......................... F21P 1/02; H05B 37/02
[52] U.S. Cl. ....................................... 362/806; 315/323
[58] Field of Search ................ 362/806; 315/160, 161, 315/174, 323; 307/80

[56] References Cited

U.S. PATENT DOCUMENTS

| | | | |
|---|---|---|---|
| 4,215,277 | 7/1980 | Weiner et al. | 315/323 X |
| 4,234,915 | 11/1980 | Malinowski et al. | 362/806 X |
| 4,254,451 | 3/1981 | Cochran, Jr. | 315/323 X |
| 4,264,845 | 4/1981 | Bednarz | 362/806 X |
| 4,284,926 | 8/1981 | Dinges | 315/323 X |
| 4,355,348 | 10/1982 | Williams | 362/806 X |
| 4,417,182 | 11/1983 | Weber | 315/323 X |
| 4,425,605 | 1/1984 | Cheng | 362/806 X |

Primary Examiner—Parshotam S. Lall
Assistant Examiner—W. R. Wolfe
Attorney, Agent, or Firm—Fleit, Jacobson, Cohn & Price

[57] ABSTRACT

Novel and special lighting effects are furnished to an ornamental harness comprising a plurality of decorative transparent or translucid devices each having a light bulb internally arranged thereto, by connecting said light bulbs in parallel with lighting effects generating means which comprise a power supply, wave generating means including a square wave generating circuit and a triangular wave generating circuit connected in parallel to said power supply, ramp generating means connected in series between said power supply and said wave generating means, frequency selecting means coupled to said wave generating means for selecting a desired frequency for the waves generated thereby, waveform selecting means coupled to said wave generating means for selecting between said square wave and said triangular wave generating circuits, and power amplifying means connected between said waveform selecting means and said parallel connected light bulbs for supplying amplified current waves to said light bulbs.

6 Claims, 2 Drawing Figures

ORNAMENTAL HARNESS WITH LIGHTING EFFECTS

FIELD OF THE INVENTION

The present invention refers to an ornamental harness with lighting effects and, more particularly, it is related with ornamental harnesses for producing lighting effects through transparent or translucid decorative devices each having an internal light bulb connected in parallel therebetween.

BACKGROUND OF THE INVENTION

A vast plurality of ornamental harnesses with lighting effects are known in the prior art, such as for instance the very well known light bulb series used for Christmas trees and the like, which produce said lighting effects by means of the provision of switching devices which turn on and off periodically the light bulbs corresponding to the series, and which lighting effects may be varied in many ways by providing, in one single harness, two or more different light bulb series, each one provided with a switching device for turning on and off the light bulbs in each series independently from the other series at different timing and frequencies to obtain a highly varied spectrum of lighting effects by the mere superposition of the turn on and turn off times of each group of light bulbs corresponding to each series.

Although the variation in the lighting effects of this type of ornamental harnesses, particularly used in Christmas trees and the like renders said devices very attractive, they nevertheless appear to be somewhat monotonous, because the only lighting effect that they accomplish is the turning on and off of a certain number of light bulbs, combined with the turning on and off of certain other light bulbs, which are included in one and the same harness, and this, in the long run, becomes highly repetitive and, therefore, no longer attractive to the watchers.

OBJECTS OF THE INVENTION

Having in mind the defects of the prior art ornamental harnesses with lighting effects, it is an object of the present invention to provide an ornamental harness of a very simple construction and yet of a very versatile action as to the variation of said lighting effects.

It is another object of the present invention to provide an ornamental harness of the above mentioned character, which will be capable of producing highly varied lighting effects manually selectable by the user.

One other and more particular object of the present invention is to provide an ornamental harness with lighting effects, of the above mentioned character, which by very simple means will be capable of producing a lighting wave of different shapes and frequencies, as well as ramp effects in said lighting wave for accomplishing any combination of highly varied and attractive lighting effects.

The foregoing objects and others ancillary thereto are preferably accomplished as follows:

According to a preferred embodiment of the present invention, said novel and special lighting effects in an ornamental harness built in accordance with the preferred embodiment of the invention are provided by a harness comprising a plurality of decorative transparent or translucid devices each having a light bulb internally arranged thereto, said light bulb being connected in parallel with lighting effects generating means which comprise a power supply, wave generating means including a square wave generating circuit and a triangular wave generating circuit connected in parallel to said power supply, a ramp generating means connected in series between said power supply and said wave generating means, frequency selecting means coupled to said wave generating means for selecting a desired frequency for the waves generated thereby, waveform selecting means coupled to said wave generating means for selecting between said square wave and said triangular wave generating circuits, and power amplifying means connected between said waveform selecting means and said parallel connected light bulbs for supplying amplified current waves to said light bulbs.

BRIEF DESCRIPTION OF THE DRAWINGS

The novel features that are considered characterstic of the present invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1:
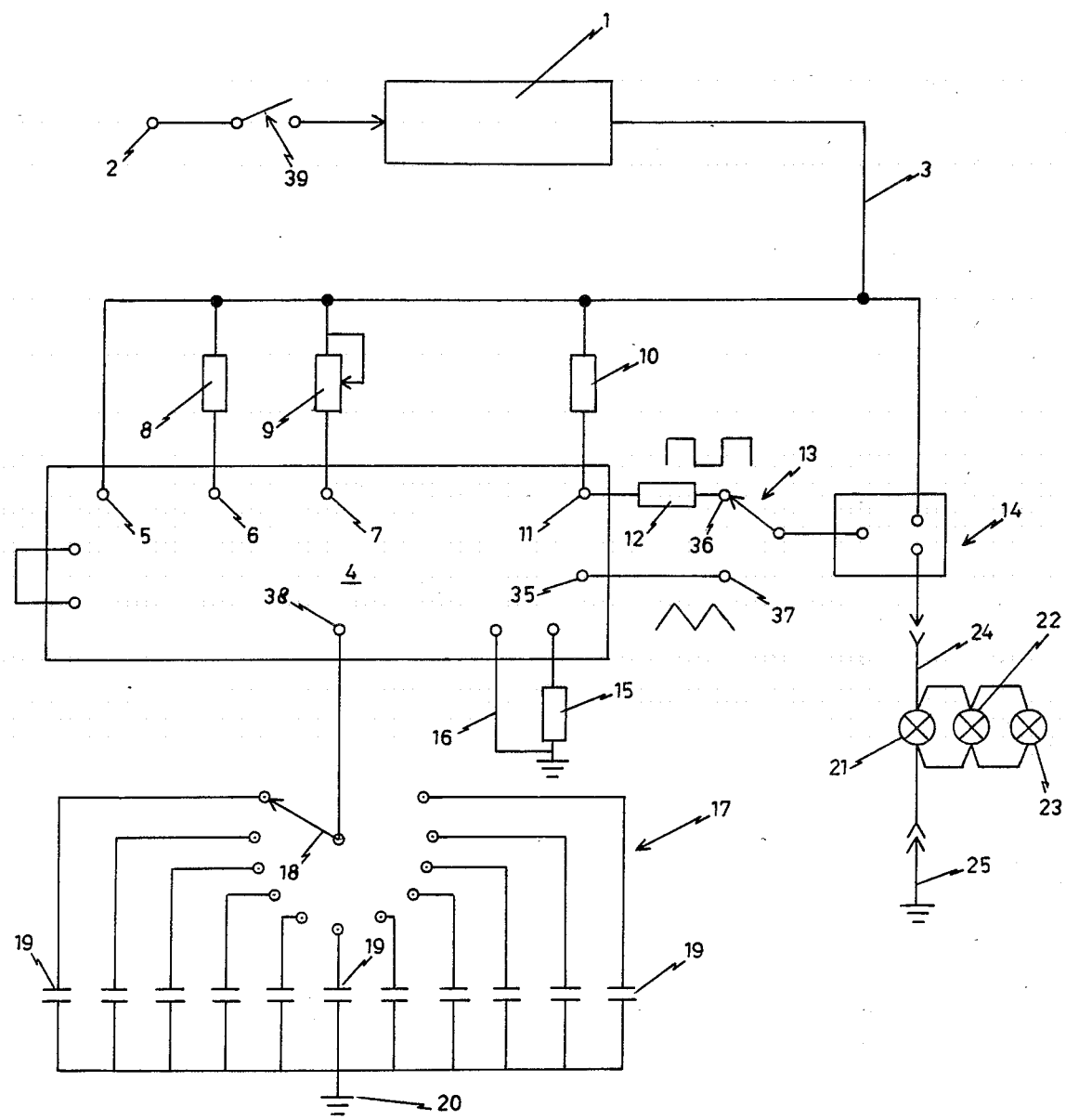
FIG. 1 is a block diagram of the circuit used in the ornamental harness with lighting effects built in accordance with the present invention.

Having now more particular reference to the accompanying drawings and more specifically to FIG. 1 thereof, the circuitry incorporated in the ornamental harness with lighting effects in accordance with a preferred embodiment of the present invention, as shown in FIG. 1, comprises a power source 1 which is supplied with alternating current from a 110 volts alternate current source 2, for converting said current into direct current, particularly 12 volts D.C., which is fed through line 3, on the one hand, to the wave generator 4 and, on the other hand, to the power amplifier 14 which will be described in more detail hereinbelow.

The wave generator 4 may be of any conventional known type but preferably said wave generator 4 used in the circuit in accordance with the present invention comprises a combined wave generator which is capable of generating square waves and triangular waves and which receives the D.C. current from line 3 through contactor 5, whereas said wave generator 4 receives a reduced current through contactor 6 which is connected to line 3 through a suitable resistor 8 in order to permanently control the amplitude and the frequency of the wave generator. The wave generator 4 is also connected to line 3 by means of contactor 7, through a suitable potentiometer or rheostat 9 which is used as a ramp generator in order to convert the form of either the square wave or the triangular wave generated thereby, by producing a ramp effect both at the beginning and at the end of said wave. Finally, the output 11 of the wave generator 4, which corresponds to the line which supplies square waves, is directly connected with line 3 from the power source 1, through a suitable resistor 10, by means of the contactor 11 which constitutes the square wave output of said wave generator 4.

The other output of the wave generator 4, represented by contactor 35, is used as an output for triangular waves as diagrammatically shown in the block diagram of FIG. 1.

The wave generator is on the other hand connected to ground either through a direct line 16 or through a resistor 15 as clearly shown in FIG. 1 of the drawings.

The square wave output contactor 11 is connected, through a suitable resistor 12, to one of the contacts (contact 36) of a waveform selector switch 13, whereas the triangular wave output 35 is connected directly to the other contact 37 of said waveform selector switch 13, in order to enable the user to select square wave or triangular wave at will, when using the circuit of the present invention for feeding a plurality of ornamental devices having light bulbs therewithin.

The wave modulated current is fed by said waveform selector switch 13 to a power amplifier 14 which merely amplifies the wave, namely, provides an amplified current for direct use with the harness of ornamental devices, through line 24 which feeds the wave modulated current to a plurality of lighting ornamental devices 21, 22 and 23 which are connected in parallel to each other. Said parallel group of ornamental devices 21, 22 and 23, is also grounded through line 25 in order to provide the lighting effect through the circuitry shown in FIG. 1 as will be explained hereinbelow.

The wave generator 4 is provided also with a frequency selector device shown by means of reference character 17 in FIG. 1 of the drawings, which grounds said wave generator 4, through connector 38, to the ground contact 20, said frequency selector 17 comprising a plurality of capacitors 19 connected in parallel and a selector bar 18 which is movable for selecting each one of said capacitors 19 of the frequency selector 17, for connecting said each one capacitor 19 between the contactor 38 of the wave generator 4 and ground 20.

The capacity of said capacitors 19 is generally selected at a level of from 680 microfarads down to 0.48 microfarads, and in particular, in accordance with a preferred embodiment of the present invention, said capacitors are of 0.48, 1, 2.2, 6.3, 10, 22, 33, 68, 100, 200 and 680 microfarads in order to produce eleven different frequencies in the waves produced by said wave generator 4, which frequencies may be of from 0.5 to 100 Hertz, depending on the capacity of the capacitor 19 selected by the selector bar 18 of the frequency selector 17.

Figure 2:
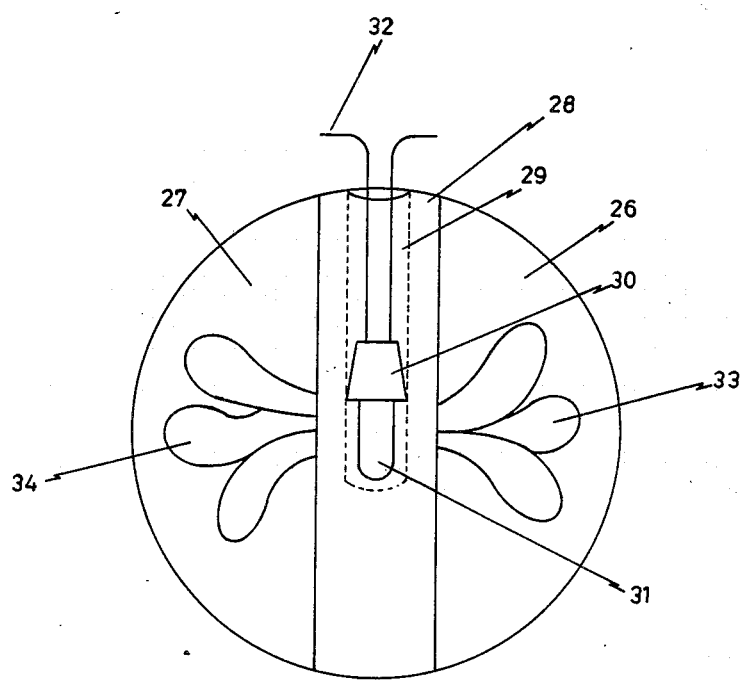
FIG. 2 is a diagrammatical view of an ornamental device with light bulb incorporated therein, built in accordance with the present invention.

While the ornamental lighting devices 21, 22, 23, etc., shown in FIG. 1 of the drawings may be of any desired type, namely, from mere light bulbs or light bulbs furnished with a simple ornament as those used in the well known Christmas tree light bulb series, in accordance with a preferred embodiment of the present invention said ornamental lighting devices are built as shown in FIG. 2 of the drawing, wherein a spherical ornamental lighting device is shown in detail, said ornamental device comprising two spherical segments 26 and 27, containing therewithin an ornamental figure 33 and 34, respectively, which may be varied at will and which may represent either flowers or landscapes and the like, said spherical segments 26 and 27 being generally transparent, whereas said ornamental inserts 33 and 34 are of a translucid and preferably colored material, in order to provide an attractive and highly ornamental effect when used in combination with the circuitry described above in relation to FIG. 1 of the drawings.

The two spherical segments 26 and 27 with their ornamental inserts 33 and 34, are bonded by suitable means to an intermediate spherical segment or slice 28, which completes the form of the sphere, said intermediate segment 28 comprising a longitudinal bore 29 within which a socket 30 containing a light bulb 31 is introduced and placed in the appropriate position to illuminate the ornamental inserts 33 and 34, as well as the full sphere formed by segments 26, 27 and 28, producing an ornamental effect which is very attractive as will be described hereinbelow in connection with the operation of the device. The socket 30 is connected by means of suitable lead in wires, which may be provided with a suitable connector as those commonly used in christmas trees series, for their incorporation into the parallel circuit shown in FIG. 1 of the drawings to be operated by means of the circuit described above.

It will be of course obvious to any one skilled in the art that the shape and the type of ornamental devices may be varied at will, and that FIG. 2 only illustrates a preferred embodiment of said ornamental devices, without however restricting the invention thereto.

Once the ornamental devices such as those shown in FIG. 2 are connected in parallel as shown at 21, 22 and 23 to the ground contact 25 and the current contact 24 which receives current from the power amplifier 14, the device of the present invention may be operated to produce highly varied and attractive lighting effects, by the manual operation of three single controls and a switch, namely, switch 39 connected between the alternate power supply 2 and the power source 1, waveform selector switch 13, ramp generator 9 and frequency selector 18.

Anyone skilled in the art will immediately foresee the highly varied and attractive lighting effects that may be obtained by the operation of the three last named controls, inasmuch as the waveform selector switch 13 is capable of selecting between square waves and triangular waves having a predetermined frequency, and said frequency may be varied also at will by means of the operation of the selector bar 18 of the frequency selector 17, in order to provide square or triangular waves having frequencies of from 0.5 to 100 Hertz, and finally, the operation of the ramp generator 9, may produce from 0 ramp waves, to highly ramp-like wave terminations, thus providing a combination of lighting effects that cannot be provided by any device of the prior art in connection with ornamental devices.

For instance, by selecting a capacitor 19 which produces a frequency of around 100 Hertz, and with the ramp generator 9 placed at its lower position, the waveform selector switch 13 may select between square waves or triangular waves which produce a scintillating effect, whereas at the opposite position, namely, with a capacitor 19 selected to produce very low frequency waves of, for instance, 0.5 Hertz, and the ramp generator 9 placed at the uppermost position to produce large ramps in the waves, the waveform selector switch may select between square waves and triangular waves which produce a very attractive effect of gradually lighting and turning off the ornamental devices 21 to 23, for a very soft and gentle change in the illumination of the ornamental devices, thus producing a highly tranquile and attractive effect. Any variation between these two opposite and extreme points may be accomplished by means of the suitable operation of the controls 9, 13 and 18 of the circuit of the present invention, whereby the ornamental harness of the present invention may be provided with a large plurality of different lighting effects that may be selected at will by the user through the simple operation of three different controls that may be set in any position at will, to achieve the desired lighting effect.

Although certain specific embodiments of the present invention have been shown and described above, it is to be understood that many modifications are possible. The present invention, therefore, is not to be restricted except insofar as is necessitated by the prior art and by the spirit of the appended claims.

What is claimed is:

1. An ornamental harness with lighting effects comprising at least one decorative light transmitting device having a light bulb internally arranged thereto, said light bulb being connected between ground and a current line in turn connected with lighting effects generating means, said lighting effects generating means comprising power supply means, wave generating means connected to said power supply means and including a square wave generating circuit and a triangular wave generating circuit, ramp generating means connected to said wave generating means, frequency selecting means connected to said wave generating means, waveform selecting means connected to said wave generating means for selecting between said square wave generating circuit or said triangular wave generating circuit, and power amplifying means connected to said waveform selecting means and to said light bulb of said at least one decorative light transmitting device for supplying amplified current waves to said light bulb.

2. An ornamental harness according to claim 1 wherein a plurality of said decorative light transmitting devices are connected in parallel between ground and said current line connected to said lighting effects generating means.

3. An ornamental harness according to claim 1 wherein said ramp generating means comprises a variable resistor connected between said power supply means and said wave generating means.

4. An ornamental harness according to claim 1 wherein said frequency selecting means comprises a plurality of capacitors each having a different capacity, a selector bar connectable to anyone of said capacitors at one of its ends and connected to said wave generating means at its other end, each one of said capacitors being connected to ground.

5. An ornamental harness according to claim 1 wherein said waveform selecting means comprises two alternately closable contacts, one of said contacts being connected to said square wave generating circuit and the other of said contacts being connected to said triangular wave generating circuit, and a switching bar connectable to one or the other of said contacts for selecting a waveform.

6. An ornamental harness according to claim 1 wherein said decorative light transmitting device comprises a transparent spherical body, at least one translucid decoration embedded within said transparent spherical body, a bore centrally arranged to said body and penetrating within said at least one translucid decoration, and a light bulb inserted within said bore.

* * * * *